Dec. 19, 1933.    J. N. NELSON    1,940,140
OPHTHALMIC MOUNTING
Filed July 17, 1931
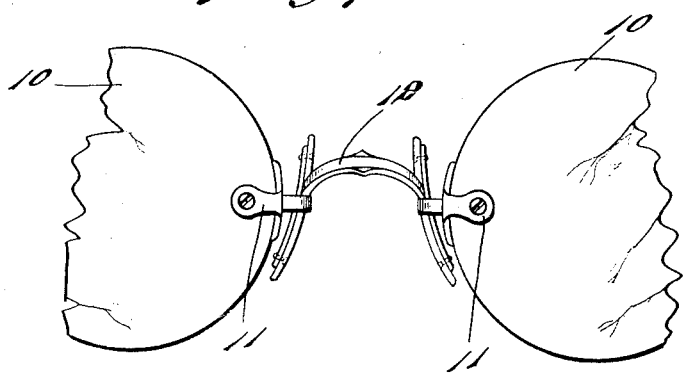
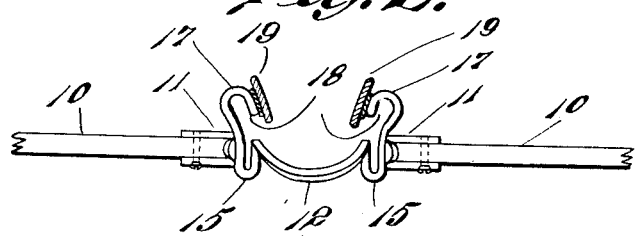
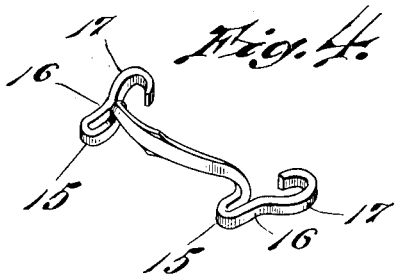
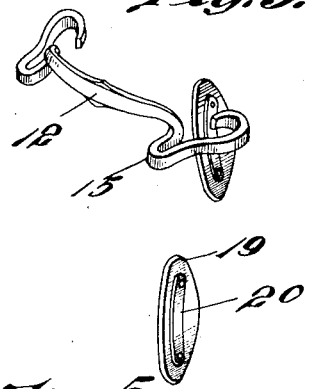
INVENTOR.
John N. Nelson
BY Barlow & Barlow
ATTORNEYS.

Patented Dec. 19, 1933

1,940,140

UNITED STATES PATENT OFFICE

1,940,140

OPHTHALMIC MOUNTING

John N. Nelson, Cranston, R. I., assignor to Universal Optical Corporation, a corporation of Rhode Island Application July 17, 1931. Serial No. 551,404

4 Claims. (Cl. 88—43)

This invention relates to an improved construction of ophthalmic mounting; and has for its object to provide an improved bridge member connecting the lens-engaging members, the end portions of the bridge member being arranged to extend rearwardly from the plane of the lenses to provide integral nose guard arms.

A further object of the invention is to form this bridge member of a single piece of wire, the end portions of the wire being folded upon themselves forming loops, the end portions of the loops extending rearwardly from the lens-engaging members forming nose-guard arms to which the lens-engaging members are also attached.

With these and other objects in view, the invention consists of certain novel features of construction, as will be more fully described, and particularly pointed out in the appended claims.

In the accompanying drawing:

Fig. 1 is a front view, showing one form of my improved ophthalmic mounting;

Fig. 2 is a top edge view of the mounting, showing the lenses mounted in lens holders and the end portions of the bridge as forming forwardly-extending loops and rearwardly-extending nose guard arms;

Fig. 3 is a perspective view of the bridge member, showing one of the nose guards connected thereto;

Fig. 4 is a perspective view showing both of the nose guards removed;

Fig. 5 is a rear view of one of the nose guards formed of non-metallic material with a metallic strip attached thereto to which the end of the arm may be attached;

Fig. 6 is a perspective view of a lens holder or engaging member;

Fig. 7 is a perspective view illustrating a single length of wire from which the bridge member with its rearwardly extending nose guard arms are formed.

It is found in the practical construction of bridge members for ophthalmic mountings of advantage to form this bridge member and the nose-guard arms of a single length of wire or strip of metal so as to provide a very strong and durable mounting and at the same time reduce the soldering operation to the minimum; and to obtain these desirable results I have constructed the bridge member from a wire or strip of material, of a length sufficient to form both the bridge and the nose-guard arms by a simple bending operation, which is accomplished by so folding the ends of the bridge wire as to provide rearwardly-extending nose-guard arms of the desired length to support the nose guard and at the same time provide a substantial attaching surface to which the lens-holding members may be connected by solder, rivets, or other suitable means and the following is a detailed description of the present embodiment of my invention and showing one construction of bridge member by which these advantageous results may be accomplished:—

With reference to the drawing, 10 designates the lenses which are herein shown as being mounted in lens-engaging members or holders 11 arranged in spaced relation to which my improved bridge member 12 is attached.

This bridge member is preferably constructed from a single piece of wire 13, as illustrated in Fig. 7, the central portion 14 of which is thinned to become flexible in a horizontal plane and this portion may be shaped or ornamented in any suitable way.

The middle portion of this wire is bent, preferably into arcuate shape to extend over the nose of the wearer. The end portions of the bridge member being preferably folded to extend forwardly as at 15 and then rearwardly as at 16 a sufficient distance to provide integral nose guard carrying arms 17.

These rearwardly-extending arm portions are herein shown as crossing the lens holders at right angles to the plane of the lenses and being attached to these lens holders by solder, but any suitable means of attaching to these lens holders may be employed.

The rear extremities of these nose-guard arms 17 are folded back upon themselves as at 18, and to these extremities are attached the guard members 19 which in this particular case are shown as being made of non-metallic material such as shell or the like to the back of which is riveted a strip of metal 20 which may be soldered to the ends of the arms 17.

By my improved construction, I have eliminated the soldering operation which has heretofore been necessary for connecting these guard arms to the bridge member, and I have also by this construction provided a very strong and durable construction, the folds or loops 15 in the end portions of the bridge permitting manipulation to vary the pupillary distance of the lenses in order to fit the widely varying shapes of faces of the different wearers; also the rearwardly extending lens arms are of such length and shape that they may be bent to best fit the noses of the different wearers while the thinned center of the bridge permits flexing in a horizontal plane.

My improved ophthalmic mounting is very simple and practical in construction and effective in its operation.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an ophthalmic mounting, a pair of lens holders, a bridge member connecting said lens holders formed of a single piece of stock shaped to provide successively a portion extending rearwardly from each side of its center, a fold in substantially a vertical plane, a forwardly extending portion, a second fold in substantially a horizontal plane and a second rearwardly extending portion in the same horizontal plane with said forwardly extending portion and terminating in an inwardly extending curve, and a nose pad on said curved end.

2. In an ophthalmic mounting, a pair of lens holders, a bridge member connecting said lens holders formed of a single piece of stock with a flattened thinned center of a vertical dimension greater than its horizontal dimension and merging into a portion having generally the same right angular diameters, said portions shaped to provide successively a portion extending rearwardly from each side of its center, a fold in substantially a vertical plane, a forwardly extending portion, a second fold and a second rearwardly extending portion extending inwardly beyond the plane of the lenses, and a nose pad carried by said second rearwardly extending portion at the inwardly-extending end portion thereof.

3. In an ophthalmic mounting, a pair of lens holders, a bridge member connecting said lens holders formed of a single piece of stock with a flattened thinned center of a vertical dimension greater than its horizontal dimension and merging into a portion having generally the same right angular diameters, said portions shaped to provide successively a portion extending rearwardly from each side of its center, a fold in substantially a vertical plane, a forwardly extending portion, a second fold and a second rearwardly extending portion in the same horizontal plane with said forwardly extending portion extending inwardly beyond the plane of the lenses, and a nose pad carried by said second rearwardly extending portion at the inwardly-extending end portion thereof.

4. In an ophthalmic mounting, a pair of lens holders, a bridge member connecting said lens holders formed of a single piece of stock with a flattened thinned center of a vertical dimension greater than its horizontal dimension and merging into a portion having generally the same right angular diameters, said portions shaped to provide successively a portion extending rearwardly from each side of its center, a fold in substantially a vertical plane, a forwardly extending portion, a second fold in substantially a horizontal plane, a second rearwardly extending portion extending beyond the plane of the lenses and terminating in an inwardly-extending curve, and a nose pad carried by said second rearwardly extending portion at the curved end thereof.

JOHN N. NELSON.